(12) United States Patent
Lin

(10) Patent No.: US 7,510,394 B2
(45) Date of Patent: Mar. 31, 2009

(54) GAS-POWERED HEATING APPARATUS

(76) Inventor: Arlo Lin, Akara Building, 24 De Castro Street, Wickhams Cay I Road Town, Tortola (VG)

(*) Notice: Subject to any disclaimer, the term of this patent is extended or adjusted under 35 U.S.C. 154(b) by 370 days.

(21) Appl. No.: 11/050,916

(22) Filed: Feb. 4, 2005

(65) Prior Publication Data
US 2006/0174865 A1 Aug. 10, 2006

(51) Int. Cl.
*F23D 14/28* (2006.01)
(52) U.S. Cl. .......................... 431/344; 431/66; 431/72; 431/12; 126/401
(58) Field of Classification Search .................. 431/66, 431/156, 72, 36, 37, 344, 12; 277/932; 92/226; 239/75; 126/401–414; 236/8, 9, 18, 19, 236/33, 75, 87, 93, 96
See application file for complete search history.

(56) References Cited

U.S. PATENT DOCUMENTS

| | | | | | |
|---|---|---|---|---|---|
| 1,764,659 | A | * | 6/1930 | Stokes | 123/179.15 |
| 2,233,659 | A | * | 3/1941 | Wittmann | 137/65 |
| 2,271,850 | A | * | 2/1942 | Zinkil | 236/80 R |
| 2,283,903 | A | * | 5/1942 | Ashcraft | 335/217 |
| 2,285,913 | A | * | 6/1942 | Derrah | 236/68 B |
| 2,390,985 | A | * | 12/1945 | Boyer | 431/59 |
| 2,407,170 | A | * | 9/1946 | Malek | 431/58 |
| 2,425,007 | A | * | 8/1947 | Rouse | 91/459 |
| 2,461,615 | A | * | 2/1949 | Taylor | 137/492 |
| 2,601,579 | A | * | 6/1952 | Wittmann | 236/88 |
| 2,747,832 | A | * | 5/1956 | Vischer, Jr. | 251/161 |
| 2,777,662 | A | * | 1/1957 | Hansen | 251/11 |
| 2,960,303 | A | * | 11/1960 | Smallpeice | 251/11 |
| 3,042,363 | A | * | 7/1962 | Deeks | 251/362 |
| 3,346,231 | A | * | 10/1967 | Wall | 251/11 |
| 3,587,963 | A | * | 6/1971 | Vanderlann et al. | 236/92 R |
| 3,704,697 | A | * | 12/1972 | Weymann | 123/406.7 |
| 3,930,613 | A | * | 1/1976 | Place | 236/48 R |
| 4,060,193 | A | * | 11/1977 | Foller | 236/59 |
| 4,142,553 | A | * | 3/1979 | Sakakibara et al. | 137/625.44 |
| 4,456,216 | A | * | 6/1984 | Boruta | 251/11 |
| 4,474,212 | A | * | 10/1984 | Schmitz | 137/614.11 |
| 5,058,856 | A | * | 10/1991 | Gordon et al. | 251/11 |
| 5,259,412 | A | * | 11/1993 | Scott et al. | 137/588 |
| 5,337,718 | A | * | 8/1994 | Tuckey | 123/464 |
| 5,398,655 | A | * | 3/1995 | Tuckey | 123/456 |
| 5,509,390 | A | * | 4/1996 | Tuckey | 123/463 |
| 5,551,723 | A | * | 9/1996 | Mahon et al. | 280/737 |
| 5,579,739 | A | * | 12/1996 | Tuckey et al. | 123/467 |
| 5,720,055 | A | * | 2/1998 | Krist | 4/420.4 |
| 5,799,648 | A | * | 9/1998 | Oglesby et al. | 126/414 |
| 5,838,351 | A | * | 11/1998 | Weber | 347/85 |
| 6,745,995 | B2 | * | 6/2004 | Hu et al. | 251/81 |
| 7,168,597 | B1 | * | 1/2007 | Jones et al. | 222/402.2 |
| 2002/0079474 | A1 | * | 6/2002 | Del Garbino et al. | 251/212 |

* cited by examiner

*Primary Examiner*—Alfred Basichas
(74) *Attorney, Agent, or Firm*—Alan Kamrath; Kamrath & Associates PA

(57) ABSTRACT

A gas-powered heating apparatus includes a reservoir for storing fuel, a combustor communicated with the reservoir for burning the fuel, a switch provided between the reservoir and the combustor for turning on/off the supply of the fuel to the combustor from the reservoir and a controlling device provided between the reservoir and the combustor for controlling the rate of the supply of the fuel to the combustor.

18 Claims, 11 Drawing Sheets

GAS-POWERED HEATING APPARATUS

BACKGROUND OF THE INVENTION

1. Field of Invention

The present invention relates to a gas-powered heating apparatus.

2. Related Prior Art

Referring to U.S. Pat. No. 5,799,648 that was issued on 1 Sep. 1998, a gas-powered heating apparatus 1 includes a handle 2, a barrel 6 extending from the handle 2 a head 4 from which the barrel 6 projects and a tip 8 extending from the head 4. The handle 2 and the head 4 are both hollow. A reservoir 23 is located in the handle 2 for storing fuel. A combustor 10 is located in the head 4 for burning the fuel. A controlling device 28 is located in the barrel 6 for controlling the supply of the fuel to the combustor 10 from the reservoir 23. A switch 32 is located between the reservoir 23 and the controlling device 28 for switching on/off the supply of the fuel to the controlling device 28 from the reservoir 23. A switch 32 is located between the reservoir 23 and the controlling device 28 for switching on/off the supply of the fuel to the controlling device 28 from the reservoir 23. A throttle 29 is located in the barrel 6 for controlling the flow rate of the fuel to the combustor 10 from the reservoir 23. The controlling device 28 includes a valve 39, a first element 70, a second element 71 and a permanent magnet 63 located between the first element 70 and the second element 71. The first element 70 is made of thermomagnetic material. The second element 71 is made of magnetic material. The magnetic attraction between the permanent magnet 63 and the first element 70 is greater than the magnetic attraction between the permanent magnet 63 and the second element 71 when the first element 70 is magnetic. Thus, the valve 39 is open so that the fuel flows to the combustor 10 from the reservoir 23 through the valve 39. The first element 70 becomes non-magnetic when the temperature reaches a limit. Therefore, the magnetic attraction between the permanent magnet 63 and the second element 71 is greater than the magnetic attraction between the permanent magnet 63 and the first element 70. Thus, the valve 39 is closed so that the fuel flows to the combustor 10 from the reservoir 23 through the throttle 29. This conventional gas-powered heating apparatus 1 is however complicated in structure, difficult in fabrication and high in cost.

The present invention is therefore intended to obviate or at least alleviate the problems encountered in the prior art.

SUMMARY OF THE INVENTION

A gas-powered heating apparatus includes a reservoir for storing fuel, a combustor communicated with the reservoir for burning the fuel, a switch provided between the reservoir and the combustor for turning on/off the supply of the fuel to the combustor from the reservoir and a controlling device provided between the reservoir and the combustor for controlling the rate of the supply of the fuel to the combustor.

The primary advantage of the gas-powered heating apparatus of the present invention is the simple structure. Another advantage of the gas-powered heating apparatus of the present invention is the easy fabrication. Another advantage of the gas-powered heating apparatus of the present invention is the low cost.

Other advantages and novel features of the invention will become more apparent from the following detailed description taken in conjunction with the drawings.

BRIEF DESCRIPTION OF DRAWINGS

The present invention will be described through detailed illustration of embodiments referring to the drawings.

DETAILED DESCRIPTION OF EMBODIMENTS

Figure 1:
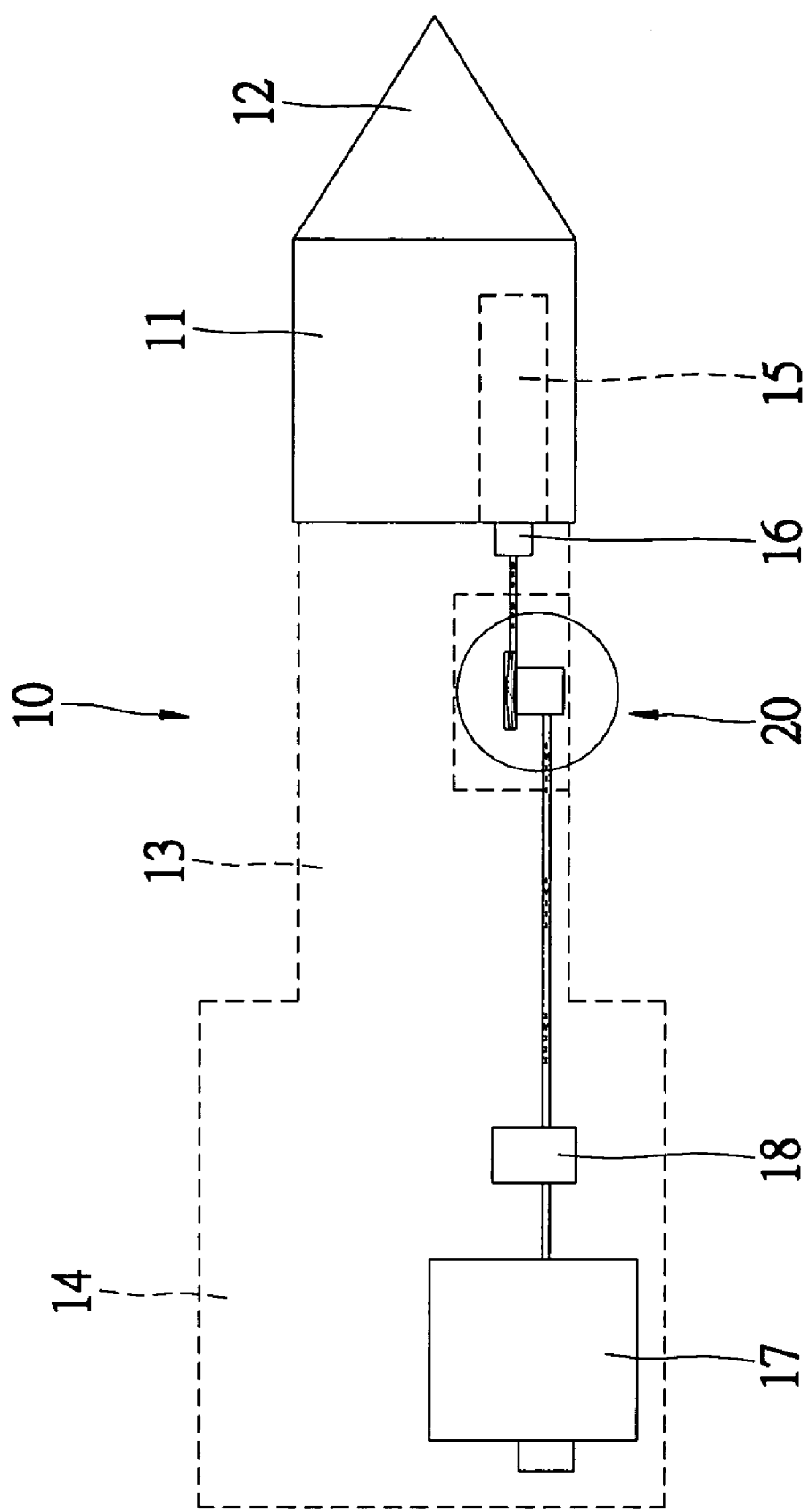
FIG. 1 is a flow chart of a gas-powered heating apparatus according to a first embodiment of the present invention.

Referring to FIG. 1, according to a first embodiment of the present invention, a gas-powered heating apparatus 10 includes a handle 14, a barrel 13 extending from the handle 14, a head 11 connected with the barrel 13 and a tip 12 extending from the head 11.

A reservoir 17 is provided in the handle 14 for storing fuel. A switch 18 is provided in the handle 14 and communicated with the reservoir 17 for switching on/off the supply of the fuel from the reservoir 17. A controlling device 20 is provided in the barrel 13 and communicated with the switch 18 for controlling the supply of the fuel from the reservoir 17. A nozzle 16 is provided in the barrel 13 and communicated with the controlling device 20 for spraying the fuel. A combustor 15 is provided in the head 11 and communicated with the nozzle 16 for burning the fuel.

Figure 2:
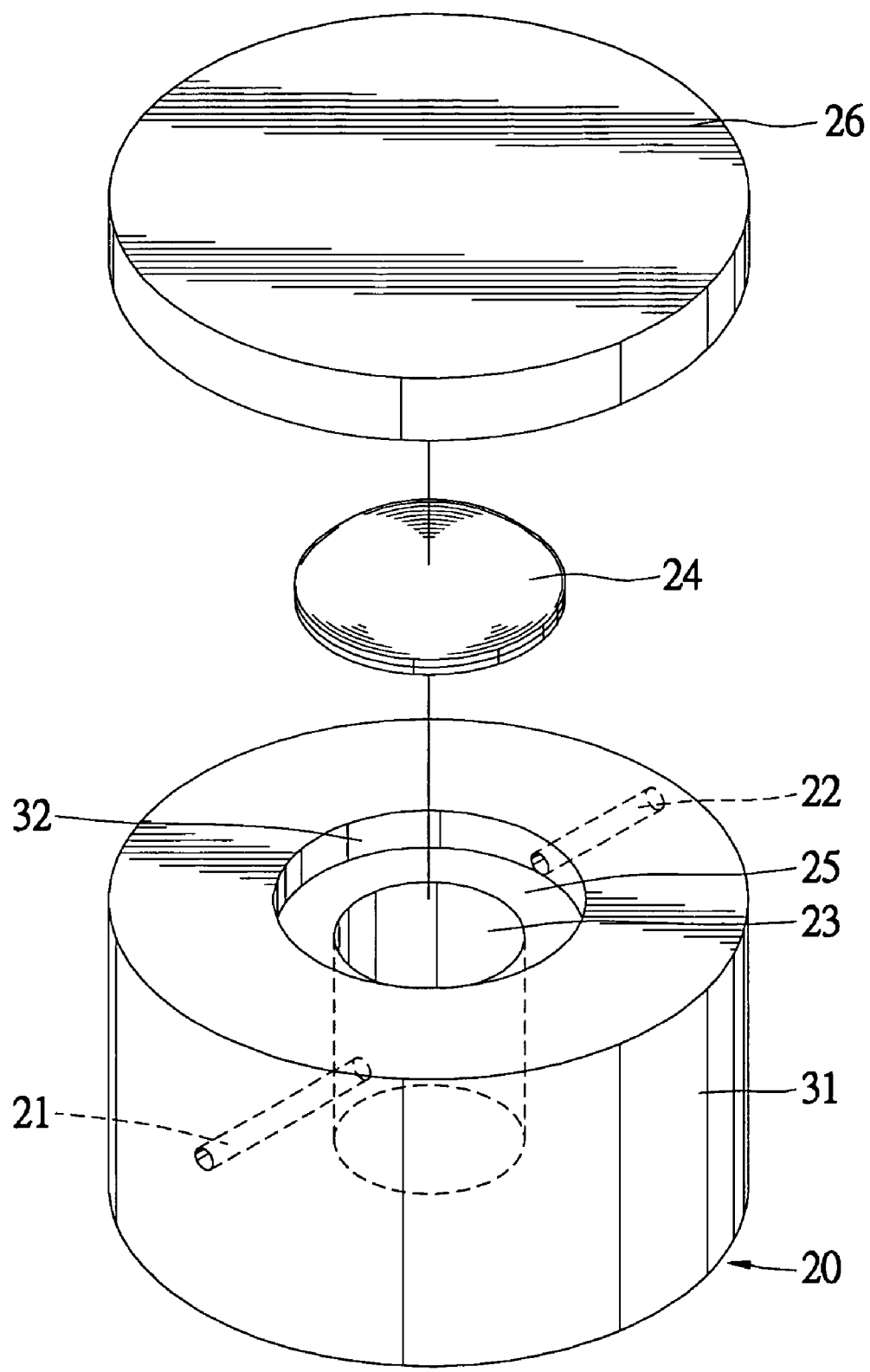
FIG. 2 is an exploded view of a controlling device used in the gas-powered heating apparatus shown in FIG. 1.

Referring to FIG. 2, the controlling device 20 includes a drum 31, an adjusting element 24 and a cover 26. The drum 31 includes an inlet 21, a first space 23 communicated with the inlet 21, a second space 25 communicated with the first space 23, a shoulder 32 formed between the first space 23 and the second space 25 and an outlet 22 communicated with the second space 25.

The adjusting element 24 is put in the second space 25. The adjusting element 24 is a laminate consisting of two metal layers with different thermal expansion coefficients so that it deforms as the temperature changes. The depth of the second space 25 is larger than the thickness of the adjusting element 24 so that the fuel can flow to the outlet 22 from the inlet 21 through the first space 23 and the second space 25.

The cover 26 is used for sealing the second space 25 of the drum 31.

Figure 3:
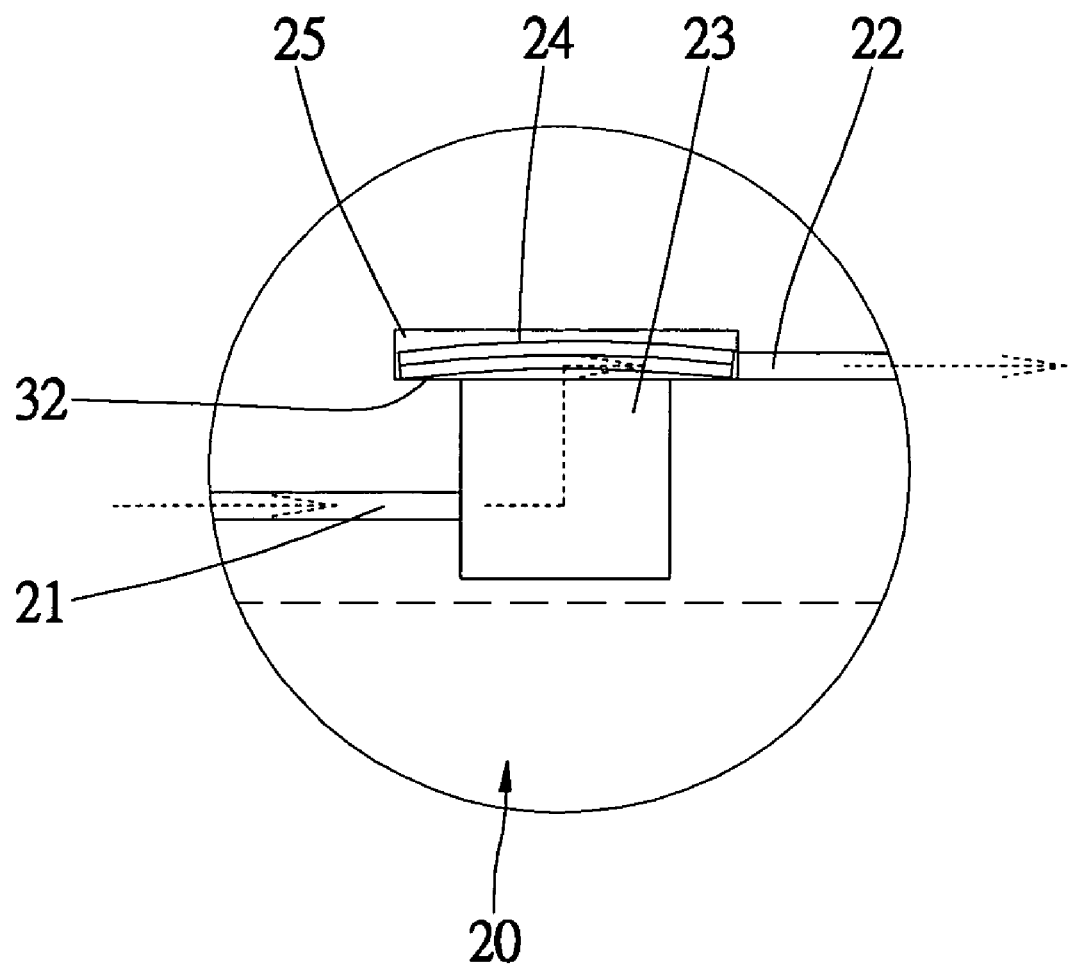
FIG. 3 is a reduced side view of the controlling device of FIG. 2.

Referring to FIGS. 1 and 3, at the normal temperature, the center of the adjusting element 24 leaves the cover 26, thus allowing the edge of the adjusting element 24 to leave the shoulder 32 by a big gap. The supply of fuel flowing through the controlling device 20 is conducted at a high rate.

Figure 4:
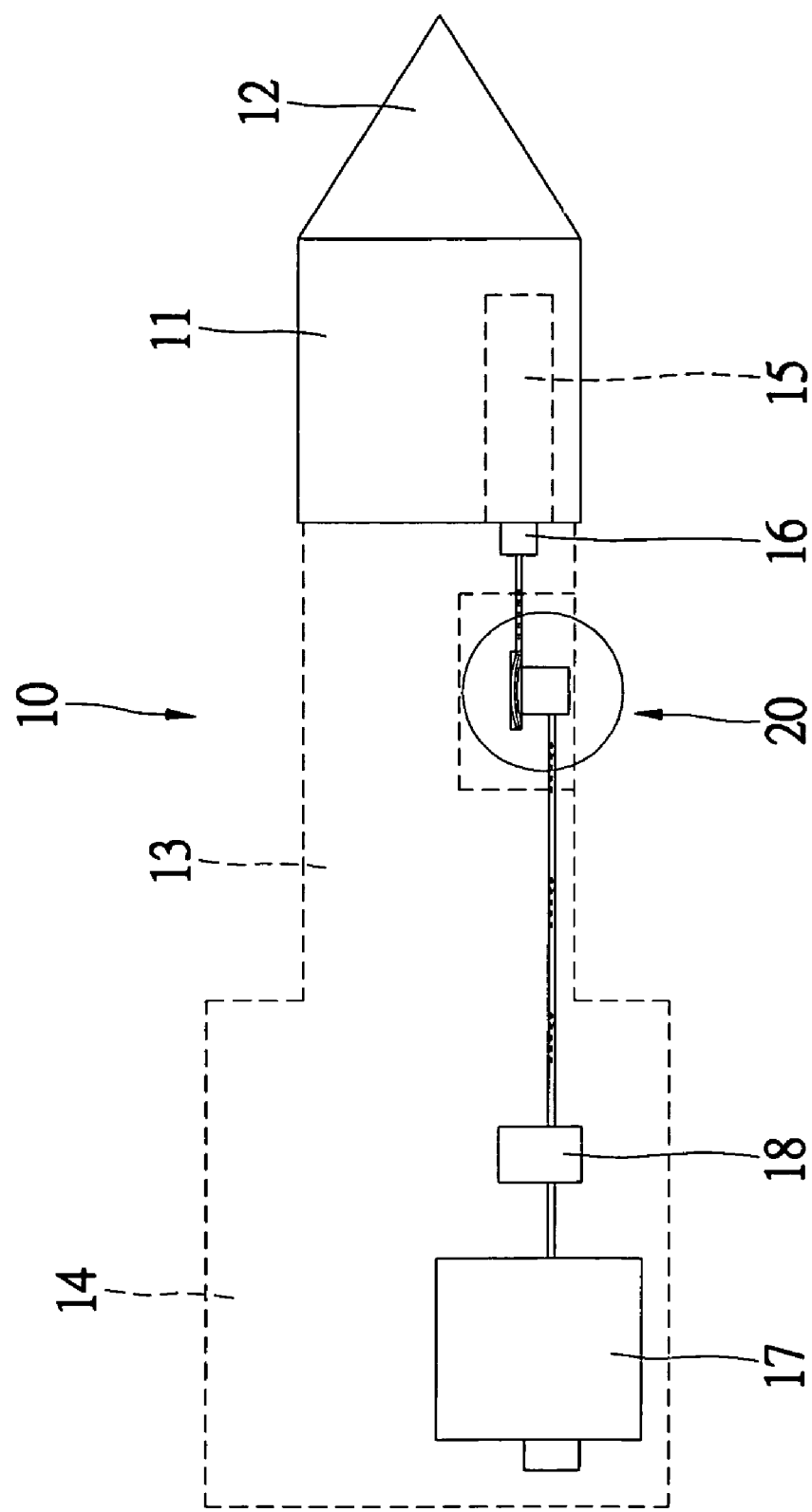
FIG. 4 is similar to FIG. 1 but shows fuel flowing through the controlling device.
Figure 5:
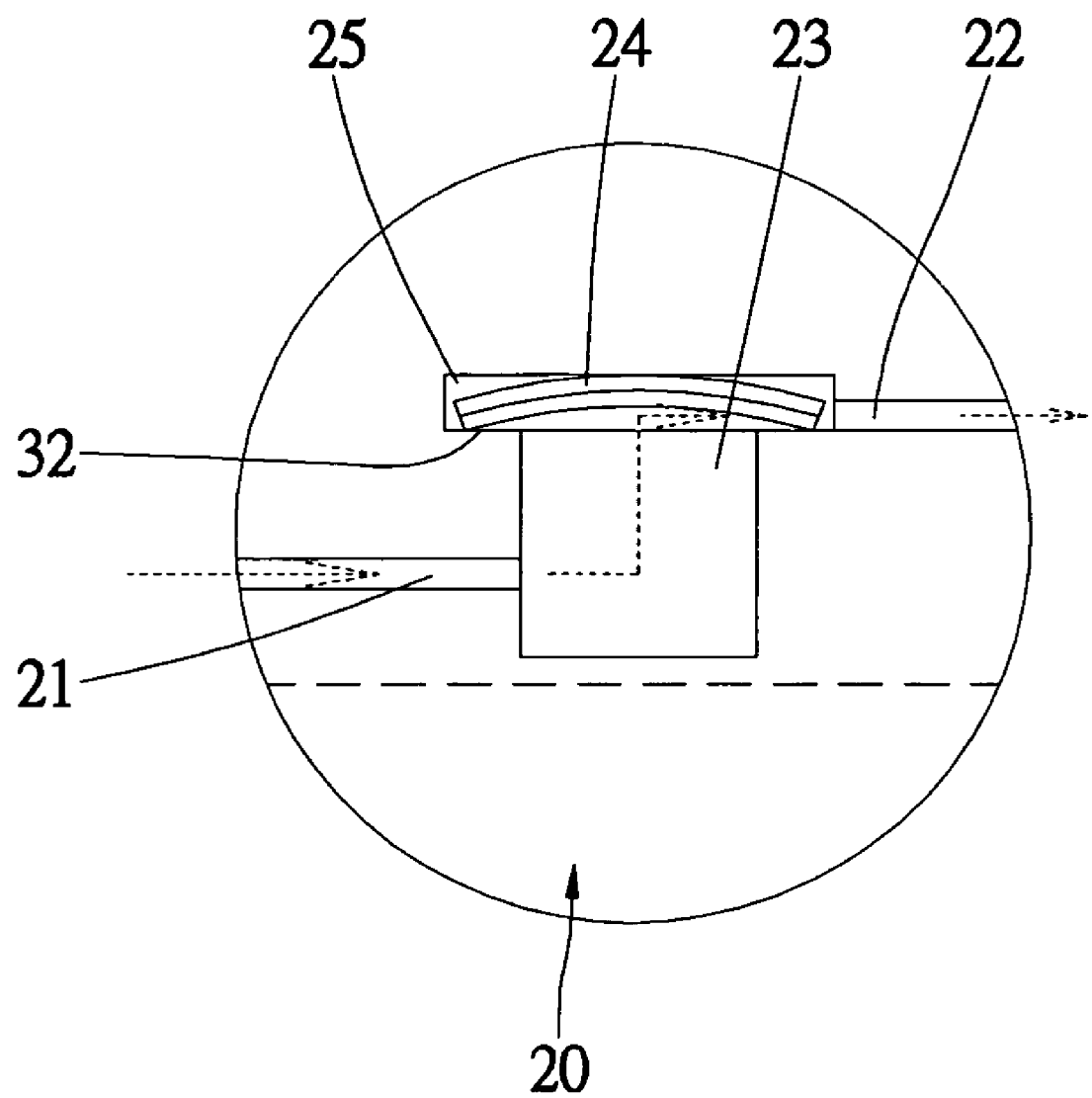
FIG. 5 is similar to FIG. 3 but shows fuel flowing through the controlling device.

Referring to FIGS. 4 and 5, the adjusting element 24 deforms as the temperature rises. The center of the adjusting element 24 abuts the cover 26, thus allowing the edge of the adjusting element 24 to leave the shoulder 32 by a limited gap. The supply of fuel flowing through the controlling device 20 is reduced. The flame produced in the combustor 15 is reduced. Hence, the rising of the temperature of the head 11 and the tip 12 is contained.

Figure 6:
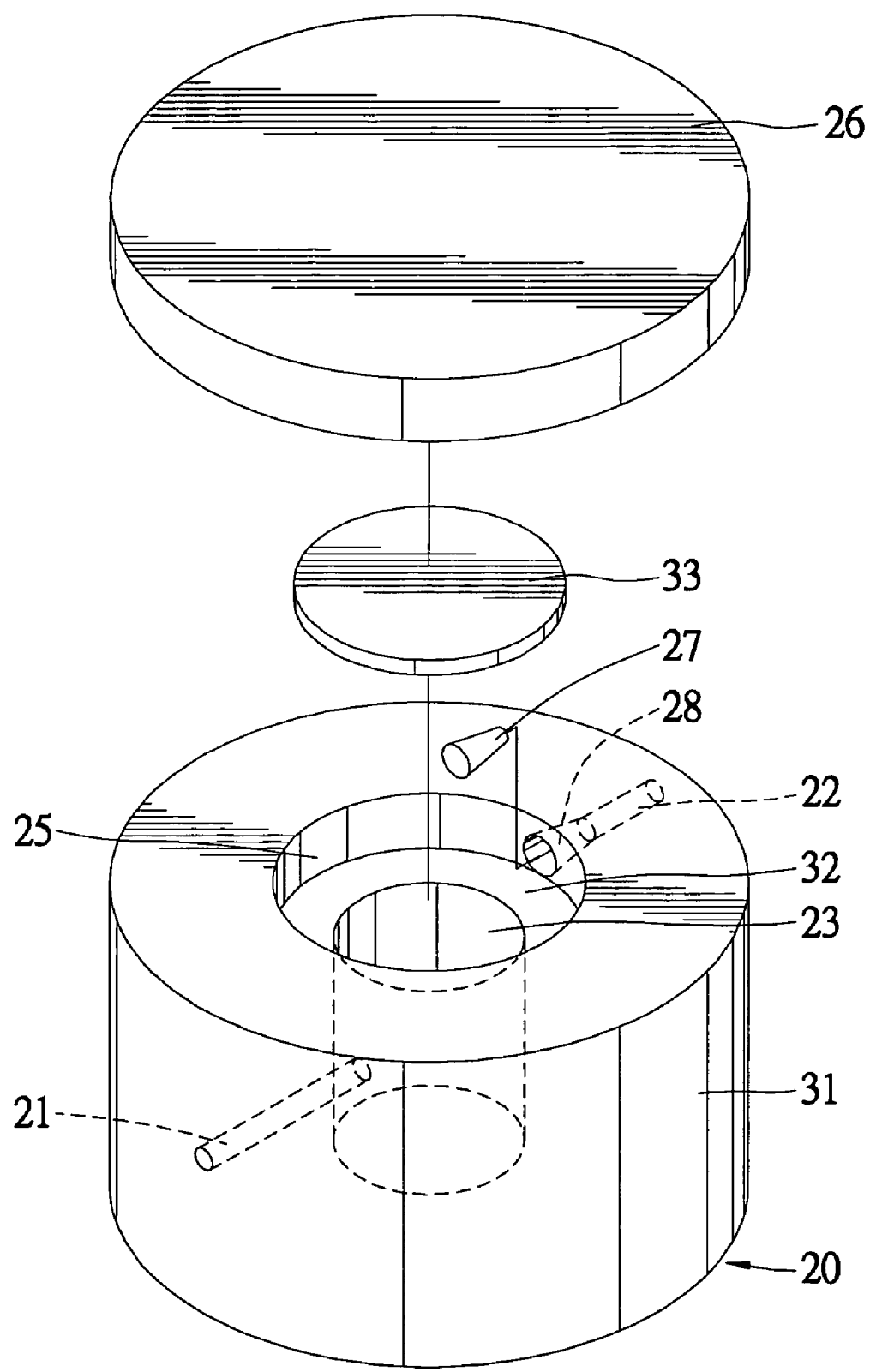
FIG. 6 is an exploded view of a controlling device according to a second embodiment of the present invention.

FIG. 6 shows a gas-powered heating apparatus 10 according to a second embodiment of the present invention. The second embodiment is identical to the first embodiment except for several things. Firstly, the controlling device 20 includes an adjusting element 33 instead of the adjusting element 24. Secondly, the controlling device 20 includes a tapered plug 27 connected with the adjusting element 33. Thirdly, the drum 31 includes a tapered passage 28 communicated with the outlet 22. The tapered plug 27 is inserted into the tapered passage 28, while the adjusting element 33 is put in the second space 25.

Figure 7:
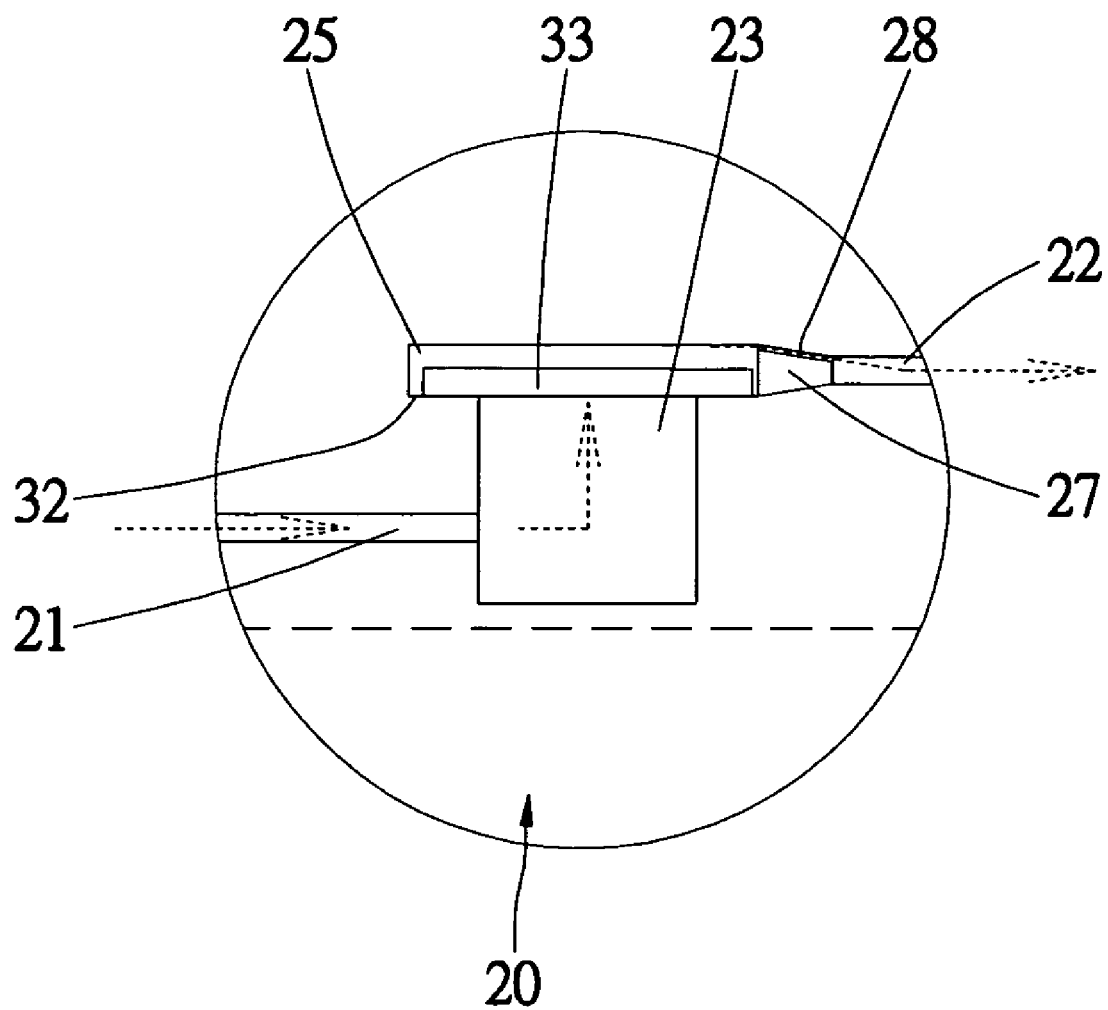
FIG. 7 is a reduced side view of the controlling device of FIG. 6.

Referring to FIG. 7, at the normal temperature, the adjusting element 33 does not deform. The gap between the tapered plug 27 and the wall of the tapered passage 28 is large. The fuel is allowed to flow through the controlling device 20 at a high rate.

Figure 8:
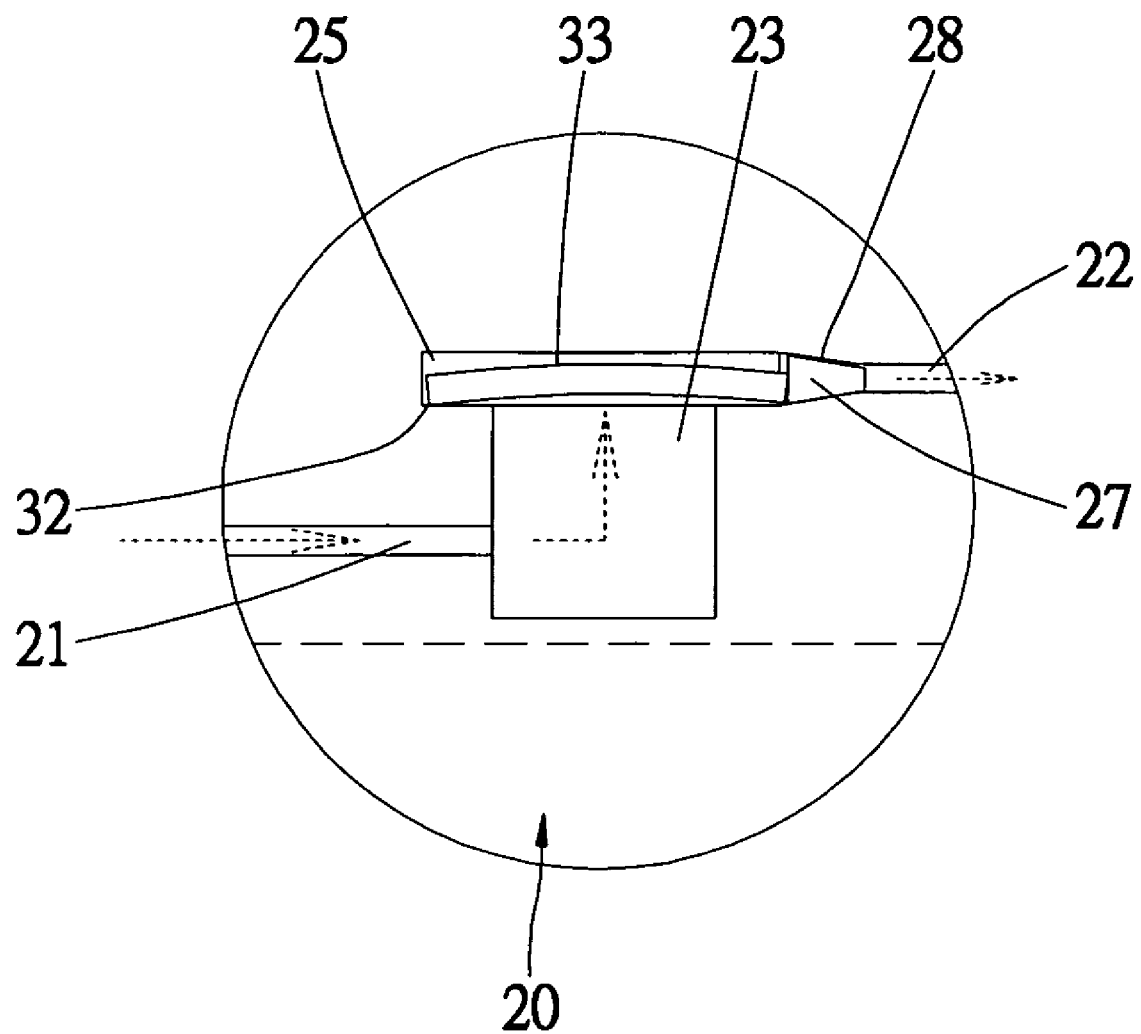
FIG. 8 is similar to FIG. 7 but shows fuel flowing through the controlling device.

Referring to FIG. 8, as the temperature rises, the adjusting element 33 expands in the second space 25 and pushes the tapered plug 27 further into the tapered passage 28. The gap between the tapered plug 27 and the wall of the tapered passage 28 is small. The fuel is allowed to flow through the controlling device 20 at a low rate.

Figure 9:
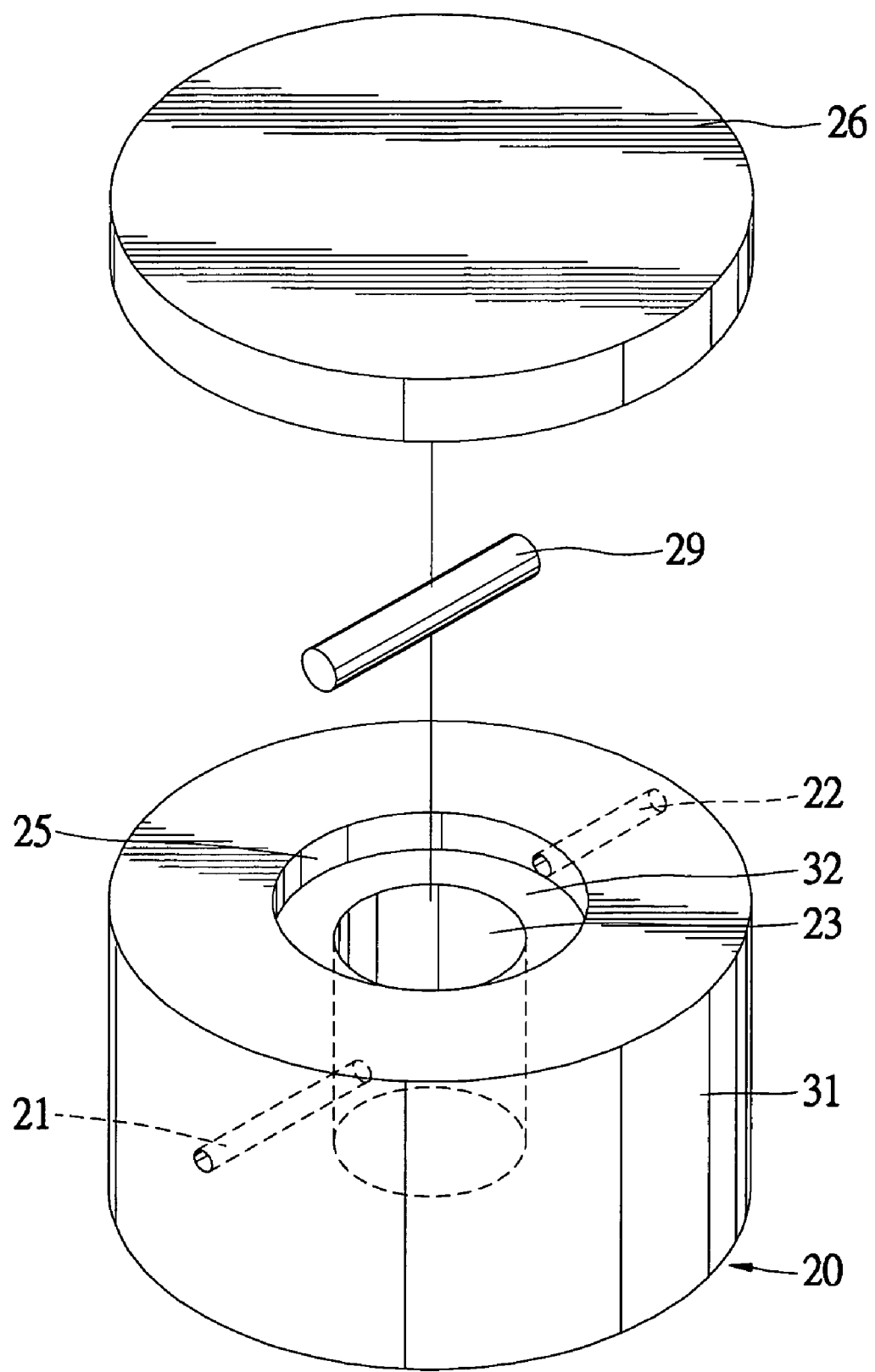
FIG. 9 is an exploded view of a controlling device according to a third embodiment of the present invention.

FIG. 9 shows a gas-powered heating apparatus 10 according to a third embodiment of the present invention. The third embodiment is identical to the first embodiment except for several things. Firstly, the controlling device 20 includes an adjusting element 29 instead of the adjusting element 24. The adjusting element 29 is shaped like a rod. The adjusting element 29 includes a fixed end firmly attached to the wall of the second space 25 and a free end aligned with the outlet 22.

Figure 10:
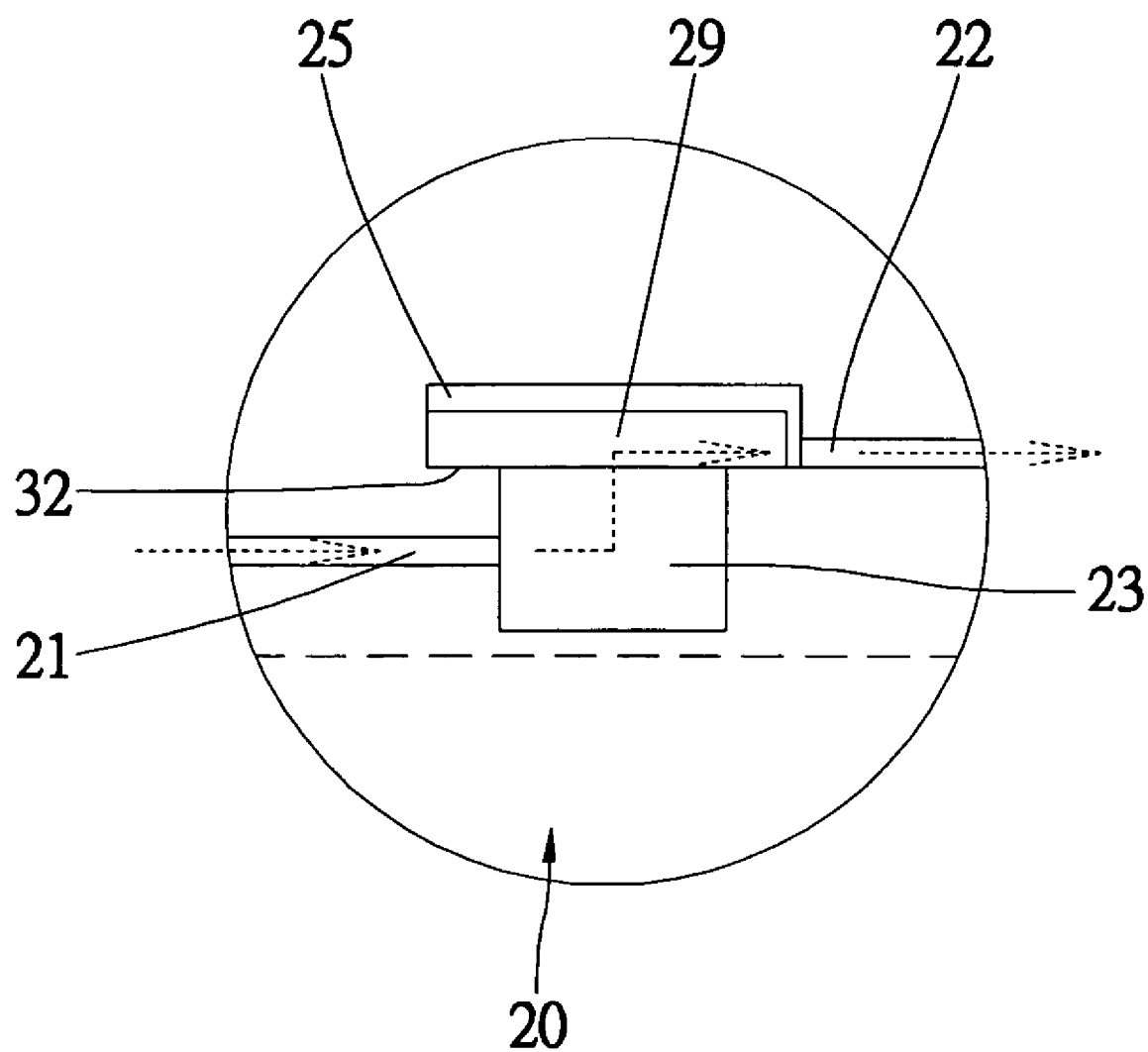
FIG. 10 is a reduced side view of the controlling device of FIG. 9.

Referring to FIG. 10, at the normal temperature, the free end of the adjusting element 29 is far from the outlet 22. The fuel is allowed to flow through the controlling device 20 at a high rate.

Figure 11:
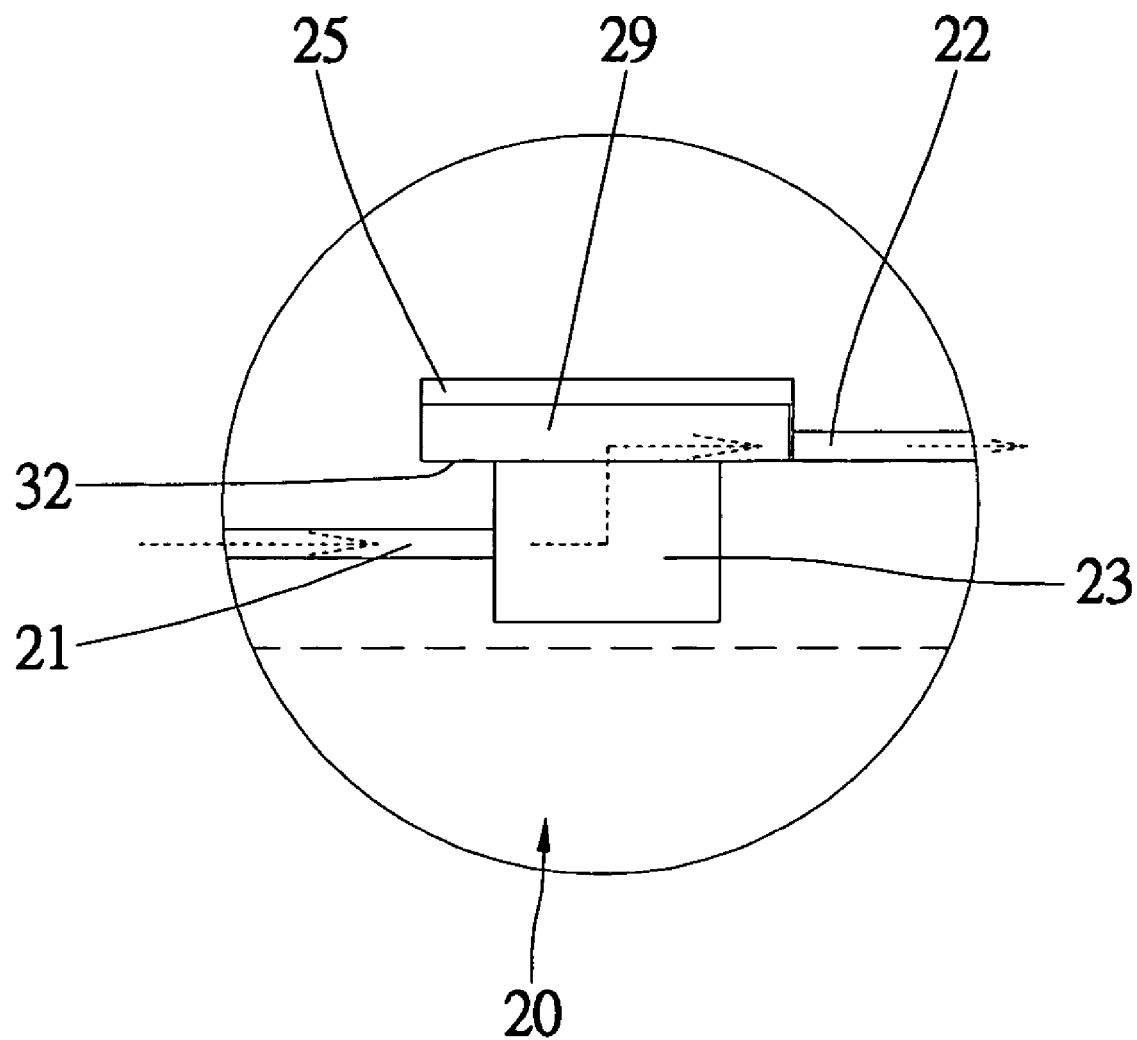
FIG. 11 is similar to FIG. 10 but shows fuel flowing through the controlling device.

Referring to FIG. 11, as the temperature rises, the adjusting element 29 expands. The free end of the adjusting element 29 moves towards the outlet 22. The fuel is allowed to flow through the controlling device 20 at a low rate.

The present invention has been described through detailed illustration of the embodiments. Those skilled in the art can derive variations from the embodiments. The embodiments hence shall not limit the scope of the present invention defined in the claims.

What is claimed is:

1. A gas-powered heating apparatus comprising:
   a reservoir storing fuel;
   a combustor communicated with the reservoir, with the combustor burning the fuel;
   and
   a controlling device provided between the reservoir and the combustor, with the controlling device controlling a rate of supply of the fuel to the combustor, wherein the controlling device comprises:
   a drum defining an inlet;
   a first space communicated with the inlet;
   a second space communicated with the first space;
   a shoulder formed between the first and second spaces;
   an outlet communicated with the second space and spaced from the shoulder with the shoulder intermediate the outlet and the first space; and
   an adjusting element located in the second space with the adjusting element deformable between first and second conditions, with the adjusting element having a highest most portion, with the highest most portion and the shoulder creating a first height when the adjusting element is in the first condition, with the highest most portion and the shoulder creating a second height when the adjusting element is in the second condition, with the first height being greater than the second height, with the adjusting element supported upon the shoulder but with a portion spaced from the shoulder by a first gap allowing communication between the first space and the outlet when the adjusting element is in the first condition, with the adjusting element supported upon the shoulder but with a portion spaced from the shoulder by a second gap when the adjusting element is in the second condition when the temperature increases, with the first gap being different than the second gap.

2. The gas-powered heating apparatus according to claim 1 wherein the controlling device controls the rate of the supply of the fuel to the combustor based on temperature.

3. The gas-powered heating apparatus according to claim 1 wherein the adjusting element is a laminate consisting of two metal layers with different thermal expansion coefficients, with the laminate supported upon the shoulder and deforming as temperature changes.

4. The gas-powered heating apparatus according to claim 3 wherein the second space has a top side spaced from and opposite of the shoulder creating a depth in the second space, with the laminate forming the adjusting element further having a first side spaced from and opposite of a second side, with the highest most point located on the first side, with the second side supported on the shoulder, with the first and second sides creating a thickness, with the depth in the second space being larger than the thickness of the adjusting element, with the laminate forming the adjusting element having a peripheral edge leaving the shoulder to define the first and second gaps and allowing the fuel to flow to the outlet from the inlet through the first and second spaces, with the adjusting element remaining in the second space when the peripheral edge of the adjusting element leaves the shoulder, with the first gap being larger than the second gap.

5. The gas-powered heating apparatus according to claim 4 further comprising a cover sealing the second space with the first side of the adjusting element abutting with the cover.

6. The gas-powered heating apparatus according to claim 4 wherein the first side abuts the top side and the adjusting element is sandwiched between the top side and the shoulder when the adjusting element is in the second condition.

7. The gas-powered heating apparatus according to claim 3 wherein the outlet comprises a tapered outlet; and wherein the controlling device further comprises a tapered plug movable in the tapered outlet and engaged by the laminate forming the adjusting element.

8. The gas-powered heating apparatus according to claim 7 wherein the adjusting element in the second condition expands and pushes the tapered plug further into the tapered outlet as the temperature rises.

9. The gas-powered heating apparatus according to claim 1 wherein the adjusting element is movable towards the shoulder in the second space when temperature increases.

10. The gas-powered heating apparatus according to claim 1 wherein the adjusting element is contained entirely in the second space.

11. The gas-powered heating apparatus according to claim 1 wherein the first space is a cylindrical shape.

12. A gas-powered heating apparatus according to claim 1 further comprising:
- a switch provided between the reservoir and the combustor, with the switch turning on or off the supply of the fuel to the combustor from the reservoir.

13. The gas-powered heating apparatus according to claim 12 wherein the controlling device is provided between the switch and the combustor, with the controlling device controlling the rate of the supply of the fuel to the combustor from the switch.

14. A gas-powered heating apparatus comprising:
- a reservoir storing fuel;
- a combustor communicated with the reservoir, with the combustor burning the fuel; and
- a controlling device provided between the reservoir and the combustor, with the controlling device controlling supply of the fuel to the combustor, wherein the controlling device comprises:
- a drum defining an inlet;
- a first space communicated with the inlet;
- a second space communicated with the first space;
- a shoulder formed between the first and second spaces;
- an outlet communicated with the second space and spaced from the shoulder with the shoulder intermediate the outlet and the first space; and
- an adjusting element located in the second space, with the adjusting element deformable between first and second conditions, with the adjusting element having a first end and a second end each supported on the shoulder, with the first end spaced from and opposite of the second end to create a first length when the adjusting element is in the first condition, with the first end spaced from and opposite of the second end to create a second length when the adjusting element is in the second condition, with the first length being less than the second length, with the adjusting element allowing communication between the first space and the outlet at a first rate when the first and second ends are supported upon the shoulder and the adjusting element is in the first condition, with the adjusting element allowing communication between the first space and the outlet at a second rate when the first and second ends are supported upon the shoulder and the adjusting element is in the second condition, with the first rate being different than the second rate.

15. The gas-powered heating apparatus according to claim 14 wherein the adjusting element is movable towards the outlet when the temperature increases.

16. The gas-powered heating apparatus according to claim 15 wherein the adjusting element is shaped like a rod.

17. The gas-powered heating apparatus according to claim 16 wherein the first end of the adjusting element comprises a fixed end secured to a wall of the second space and the second end of the adjusting element comprises a free end movable towards the outlet when temperature rises.

18. A gas-powered heating apparatus according to claim 14 further comprising:
- a switch provided between the reservoir and the combustor, with the switch turning on or off the supply of the fuel to the combustor from the reservoir.

* * * * *